US012331761B2

(12) United States Patent
McClain et al.

(10) Patent No.: US 12,331,761 B2
(45) Date of Patent: Jun. 17, 2025

(54) RECYCLING SECONDARY RESERVOIR

(71) Applicant: Deere & Company, Moline, IL (US)

(72) Inventors: Brett D. McClain, Hudson, IA (US); Benjamin E. Shores, Cedar Falls, IA (US); Marcus L. Kuhl, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/503,428

(22) Filed: Oct. 18, 2021

(65) Prior Publication Data

US 2023/0118512 A1 Apr. 20, 2023

(51) Int. Cl.
*F15B 1/26* (2006.01)
*F15B 21/041* (2019.01)

(52) U.S. Cl.
CPC .............. *F15B 1/26* (2013.01); *F15B 21/041* (2013.01)

(58) Field of Classification Search
CPC .. F15B 1/26; F15B 1/265; F15B 1/024; F15B 21/041
USPC ........................................................... 60/327
See application file for complete search history.

(56) References Cited

U.S. PATENT DOCUMENTS

2009/0191068 A1* 7/2009 St. Aubin .............. F15B 21/047 138/30

FOREIGN PATENT DOCUMENTS

| | | | | | |
|---|---|---|---|---|---|
| CN | 105705819 | A * | 6/2016 | ........... | F16D 48/062 |
| DE | 112011105277 | T5 * | 4/2014 | ........... | E02F 9/2217 |
| DE | 102018217289 | A1 | 4/2019 | | |
| WO | WO-2010140996 | A1 * | 12/2010 | ................ | E02F 9/00 |

OTHER PUBLICATIONS

Machine Translation of CN105706819 (merged with foreign document) (2022).*
Machine Translation of DE-112011105277-T5 Apr. 2014 Merged with the Original Reference.*
German Search Report dated Jun. 7, 2023 for Application Serial No. 102022208470.5 (10 pages).

* cited by examiner

*Primary Examiner* — Nathaniel E Wiehe
*Assistant Examiner* — Daniel S Collins
(74) *Attorney, Agent, or Firm* — Tucker Ellis LLP

(57) ABSTRACT

A recycling secondary reservoir of a hydraulic system is charged with clean fluid from a primary hydraulic circuit. The secondary reservoir maintains clean fluid for use by a backup pump to cycle a hydraulic device. The secondary reservoir recaptures fluid used by the backup pump to maintain clean fluid that can be reused an indefinite number of times.

12 Claims, 3 Drawing Sheets

RECYCLING SECONDARY RESERVOIR

BACKGROUND

In vehicles, particularly agricultural vehicles, a backup hydraulic pump is often utilized to cycle a park device in towing situations. Typically, clean, filtered oil is used to engage or disengage the park device. Pushing or pulling oil through a filter requires extra power due to the pressure drop across the filter. During towing situations, engine power may not be available. Accordingly, cycling the park device with clean oil often increases a power draw on the vehicle's batteries.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes a secondary reservoir configured to retain a hydraulic fluid received from a primary system. The system also includes a pump configured to operate a hydraulic device using the hydraulic fluid from the secondary reservoir. The hydraulic fluid returns to the secondary reservoir after the hydraulic device is operated.

In another implementation, a method for a hydraulic system of an agricultural vehicle is provided. The method includes supplying a secondary reservoir with a hydraulic fluid from a primary reservoir. The method also includes utilizing the hydraulic fluid from the secondary reservoir to cycle a hydraulic device. In addition, the method further includes recapturing the hydraulic fluid at the secondary reservoir after cycling the hydraulic device.

In still another implementation, a hydraulic system for a vehicle is provided. The system includes a primary circuit having a primary pump, a primary reservoir, and a filter. The system further includes a secondary circuit having a secondary reservoir and a secondary pump. The system also includes a hydraulic device operatively coupled to the primary circuit and the secondary circuit. The secondary reservoir is charged with hydraulic fluid from the primary reservoir of the primary circuit. When charged, the secondary reservoir retains the hydraulic fluid in isolation from the primary circuit. The secondary circuit is utilized to operate the hydraulic device.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
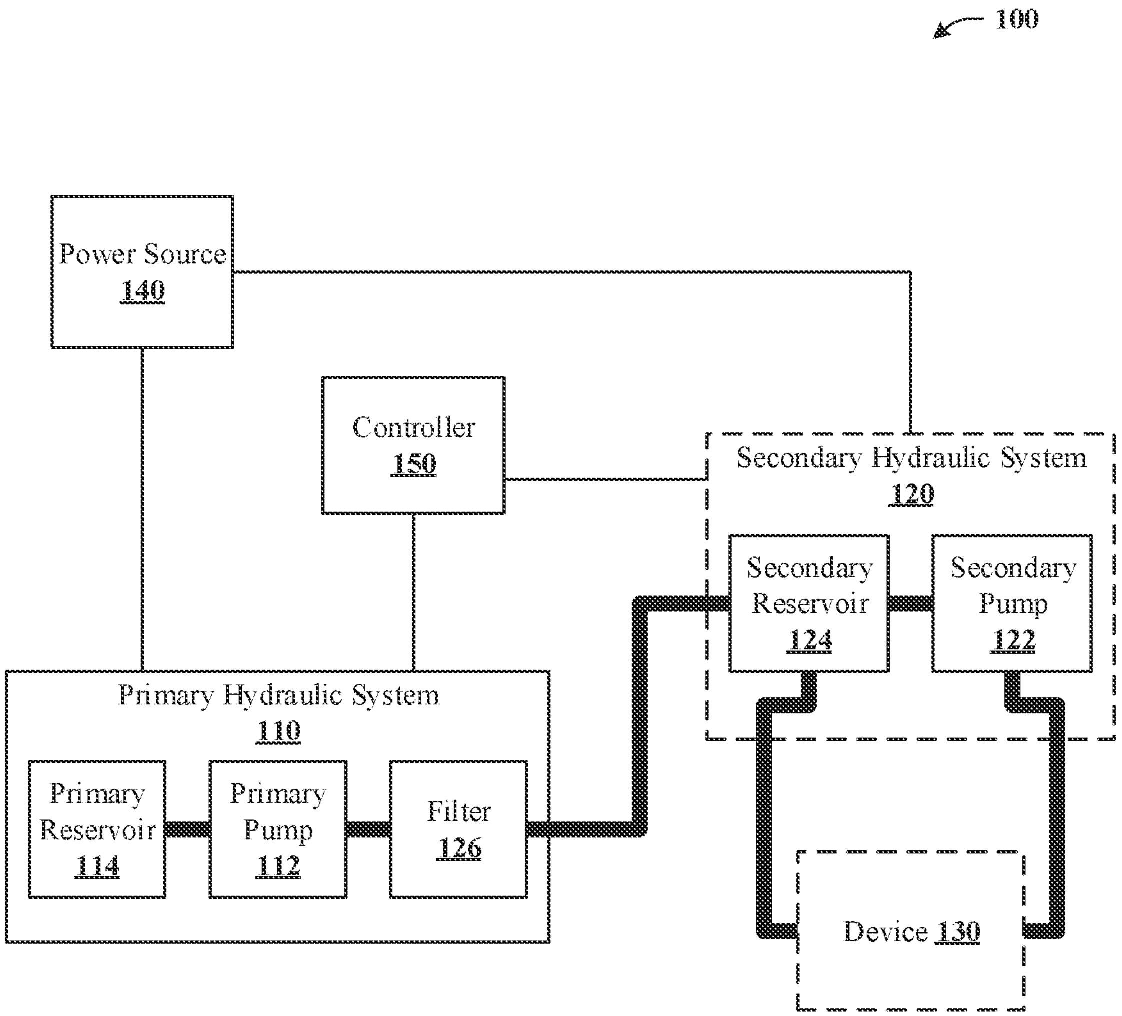
FIG. 1 illustrates an exemplary, non-limiting implementation of a hydraulic system according to various aspects.

As described above, a backup or secondary hydraulic pump may be utilized to cycle or operate a hydraulic device, particularly in situations where a primary pump is unavailable. For example, a primary pump may be connected to a vehicle drivetrain (e.g. via a power take-off) and, thus, draw engine power. In some situations, engine power may be unavailable. Accordingly, battery power is utilized to drive the backup or secondary hydraulic pump. Further, some hydraulic device, such as a park device of a vehicle, should be cycled with clean oil (more generally, hydraulic fluid). As other devices of the vehicle may pick up contaminates from an environment, hydraulic fluid is pushed or pulled through filters to remove contaminates and provide clean fluid. Due to a pressure drop across a filter, extra power is needed if a filter is included on a circuit. This increases a drain on a vehicle's batteries when operating the secondary pump.

Existing solutions may simply allow the backup pump to draw from dirty reservoirs and accept the risk of contamination entering the hydraulic device (e.g. a park device). Alternatively, some existing systems accept the excess power draw from secondary power sources (e.g. batteries) and degraded performance at low temperatures. Further, in some instances, a large clean reservoir could be dedicated to the device, but this solution only provides a finite number of cycles before this reservoir needs resupplied.

In accordance with various examples, a recycling secondary reservoir is provided for use by a backup or secondary pump in situations. For instance, vehicle-mounted hydraulic systems may be utilized to cycle various devices such as a park device. In towing situations, the park device may be engaged and/or disengaged multiple times. Further, in towing situations, engine power may not be available. In order to minimax power draw from the vehicle's batteries, the recycling secondary reservoir described herein enables a hydraulic device, such as the park device, to be cycled an indefinite number of times with clean hydraulic fluid with a secondary pump without the use of additional filtration.

According to further aspects, the secondary reservoir may be charged with clean fluid a primary circuit (e.g., from a primary reservoir using a primary pump and a filter). The charging may occur during normal cycles of the associated hydraulic device (e.g. a park device) in standard situations where, for example, primary power (e.g. engine power) is available. Once charged, the secondary reservoir maintains clean fluid available for the secondary pump to operate the hydraulic device. For instance, the clean fluid from the secondary reservoir may be used by the secondary pump to release or engage a park device during towing situations.

When the hydraulic device is cycled with the secondary pump, the clean fluid used is recaptured by the secondary reservoir. Accordingly, the clean fluid is recycled by the secondary reservoir to provide a sufficient supply for the secondary pump to operate the device again. Moreover, while the hydraulic device is pressurized, normal leakage from the hydraulic components may occur. This leakage drains to the secondary reservoir and the secondary pump can be cycled to replace the leakage with pressurized fluid. Thus, volume loss from the reservoir is reduced. For instance, without recapturing leakage to the secondary reservoir, the fluid would return to the primary circuit, for example, and additional fluid would need to be supplied to the secondary circuit.

In various aspects, the secondary reservoir disclosed herein provides clean hydraulic fluid for a pump to cycle a hydraulic device an indefinite number of times, even in situations without primary power. Further, the clean fluid is maintained without filters. The secondary reservoir eliminates a backup circuit having a large reservoir and/or additional components such as lines, filters, screens, etc.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a hydraulic system 100 is illustrated. The system 100 may be included in or utilized by an agricultural vehicle, such as a tractor, to provide hydraulic power to a variety of hydraulic devices, such as device 130. FIG. 1 depicts simplified diagrams of hydraulic system 100 and portions of the hydraulic circuits have been omitted for clarity. It is to be appreciated to one of ordinary skill in the art that additional connections may be present but not shown in FIG. 1.

In an example, utilized throughout this description, device 130 may be a hydraulic park device of a vehicle. As noted above, in towing situations, the park device may be cycled (e.g. engaged and disengaged) a plurality of times. Aspects of system 100, however, are applicable to any hydraulic system where isolation is desired to enable a backup pump to achieve a function without having hydraulic fluid mix with other hydraulic components normally coupled with a primary system.

System 100 includes a primary hydraulic system 110 having a primary reservoir 114 of hydraulic fluid (also referred to herein as hydraulic oil, oil, or fluid), a primary pump 112, and at least one filter 126. In some implementations, primary hydraulic system 110 is utilized to operate hydraulic devices, including device 130, during normal operations. Such normal operations may include, for example, situations where primary power is available. Accordingly, primary pump 112 can utilize fluid from primary reservoir 114 to cycle hydraulic devices.

Primary hydraulic system 110 may be powered by a power source 140 and controlled by a controller 150. Power source 140, in some examples, may be a vehicle engine. Primary hydraulic system 110 may be powered by a connection to the vehicle engine, via a drivetrain, power take-off, or crankshaft, for example. Alternatively, primary hydraulic system 110 may draw electrical power from batteries and/or an alternator driven by the vehicle engine. As utilized herein, power source 140 includes both mechanical and electrical power sources. That is, the vehicle engine (and connections thereto), alternator, and batteries are collectively referred to as power source 140. Depending on an operating situation, some or all portions of power source 140 may be unavailable. For instance, in a towing situation, engine power may be unavailable, but battery power remains available.

Controller 150 may include be a microcontroller, a system-on-a-chip, a FPGA, or other logic circuitry. For instance, controller 150 may include a processor, a computer memory (e.g. a non-transitory computer-readable storage medium), and interfaces to acquire inputs and send signals to various components of system 100. The memory may include computer-executable instructions that configure the processor to carry out the functions of controller 150 in system 100. In some embodiments, the controller 150 may be an electronic control unit such as an engine control unit (ECU) or the like. As such, the controller 110 may include a microcontroller, memory (e.g., SRAM, EEPROM, Flash, etc.), inputs (e.g., supply voltage, digital inputs, analog inputs), outputs (e.g., actuator inputs, logic outputs), communication interfaces (e.g., bus transceivers), and embedded software. In various implementations, controller 150 may control pumps 112 and 122, power source 140, and various valves (not shown) of system primary hydraulic system 110 and/or secondary hydraulic system 120.

As shown in FIG. 1, system 100 can include a secondary hydraulic system 120. Secondary hydraulic system 120 includes a secondary reservoir 124 and a secondary pump 122. During normal operations, device 130 can be cycled by primary hydraulic system 110 using hydraulic fluid cleaned by filter 126. In doing so, the secondary reservoir 124 is charged with clean fluid. In situations, such as towing situations, where engine power is unavailable, secondary pump 122 operates as a backup pump to cycle device 130. Pump 122 utilizes clean fluid maintained by secondary reservoir 124. The fluid used to cycle device 130, and fluid leakage from components of system 120 and device 130 is recaptured by the secondary reservoir 124. In these situations, secondary hydraulic system 120 is isolated from primary hydraulic system 110 to maintain a supply of clean fluid. The recycling nature of secondary reservoir 124 enables an indefinite number of cycles of device 130 in backup situations. As utilized herein, the secondary hydraulic system 120 is isolated from the primary hydraulic system 110 such that the primary hydraulic system 110 is prevented from utilizing fluid from the secondary reservoir 124 for other uses (e.g. for other components separate from the device 130). In this example of isolation, the secondary hydraulic system 120 and the secondary reservoir 124 remains connected to a fluid path associated with the primary hydraulic system 110 such that when the primary hydraulic system 110 operates device 130 the fluid interacts with the secondary hydraulic system 120. In another embodiment, the secondary hydraulic system 120 may be physically separated from the primary hydraulic system 120 once charged.

Figure 2:
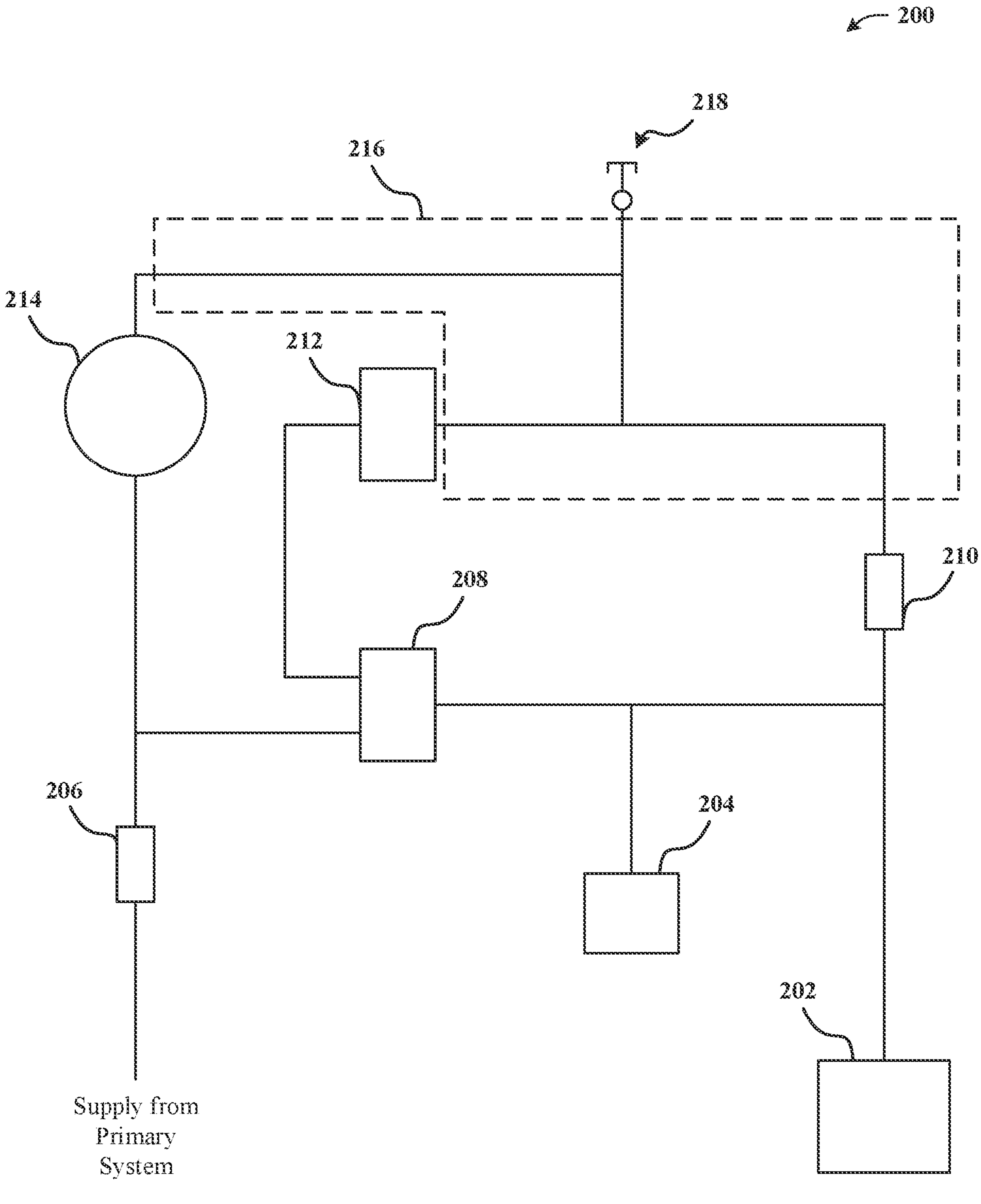
FIG. 2 illustrates an exemplary, non-limiting schematic diagram of a hydraulic system in accordance with various aspects.

Turning to FIG. 2, an exemplary, non-limiting schematic diagram of a hydraulic system 200 is depicted. System 200 may implement secondary hydraulic system 120 of FIG. 1, for example.

As shown in FIG. 2, a hydraulic device 202, such as a park device, may be normally cycled by a primary hydraulic system coupled to system 200 via a valve 206. In some implementations, valve 206 may be a check or non-return valve. In the case of a park device, which may remain engaged via a pressurized path, a pressure sensor 204 is included to monitor the pressurization. Leakage through components such as the valves of FIG. 2 can result in a loss of pressurization, which can be restored by the primary system or pump 214.

When the device 202 is cycled by the primary system, a secondary reservoir 216 is charged with clean fluid from the primary system. Fluid exceeding a capacity of the secondary reservoir 216 may return to the primary system at return 218.

As described above, system 200 may operate as a backup to cycle device 202 when the primary system is unavailable (e.g. due to a lack of engine power). Pump 214 can cycle device 202 using fluid maintained by secondary reservoir 216. The fluid returns to the secondary reservoir 216 via valves 208, 212, and/or 210. In addition, leakage when device 202 is pressurized (e.g. engaged as a park device) is also recycled to the secondary reservoir 216. Accordingly, system 200 maintains a volume of clean fluid in secondary reservoir 216 for pump 214 to cycle device 202 an indefinite number of times.

Figure 3:
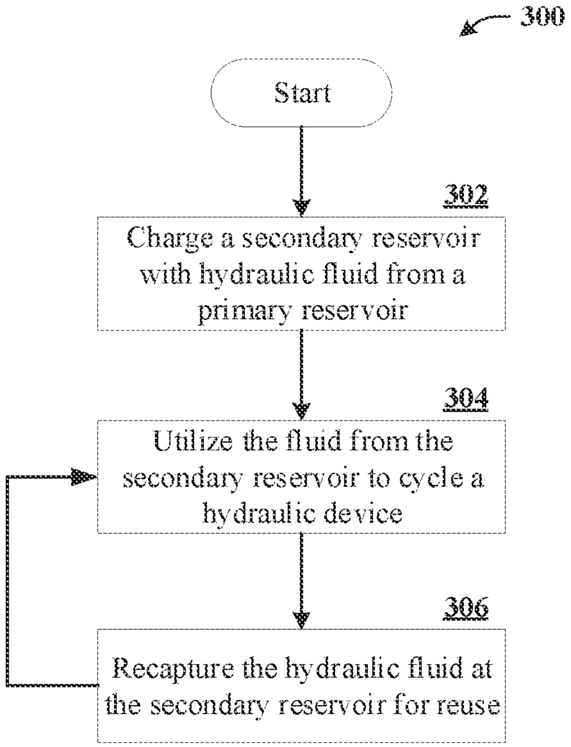
FIG. 3 illustrates an exemplary, non-limiting embodiment of a method for a hydraulic system with a secondary reservoir in accordance with various aspects.

Referring now to FIG. 3, a non-limiting embodiment of a general method 300 of employing a recycling secondary reservoir in a hydraulic system is illustrated. Method 300 may be carried out, for example, by hydraulic system 100 or system 200 described above.

Method 300 may begin at 302 where a secondary reservoir is charged with hydraulic fluid from a primary reservoir. For example, the secondary reservoir can fill with clean fluid pushed (or pulled) through a filter of a primary circuit by a primary pump. In some implementations, charging occurs with the primary circuit operates a hydraulic device also coupled to the secondary reservoir during normal operations.

In backup situations, a secondary pump may utilize fluid from the secondary reservoir cycle the hydraulic device at 304. The fluid utilized by the secondary pump is recycled, at 306, by the secondary reservoir to be used by the pump again to cycle the hydraulic device.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system, comprising:

a primary hydraulic system having a primary pump and a primary reservoir; and a secondary hydraulic system having:

a secondary reservoir that retains a hydraulic fluid received from the primary hydraulic system; and a secondary pump that operates a hydraulic device using the hydraulic fluid from the secondary reservoir, wherein the hydraulic fluid returns to the secondary reservoir after the hydraulic device is operated via the secondary hydraulic system, wherein the hydraulic fluid maintained by the secondary reservoir, once charged by the primary hydraulic system, is isolated from the primary hydraulic system, and wherein the primary hydraulic system operates the hydraulic device while charging the secondary reservoir.

2. The system of claim 1, wherein the primary system includes a filter and the hydraulic fluid received at the secondary reservoir has been cleaned by the filter.

3. The system of claim 2, wherein the secondary reservoir retains clean hydraulic fluid to operate the hydraulic device and recaptures the clean hydraulic fluid after the hydraulic device.

4. The system of claim 1, wherein the hydraulic device is a hydraulic park device of a vehicle.

5. A method, comprising:

supplying a secondary reservoir with a hydraulic fluid from a primary reservoir;

utilizing the hydraulic fluid from the secondary reservoir to cycle a hydraulic device;

recapturing the hydraulic fluid at the secondary reservoir after cycling the hydraulic device; and operating the hydraulic device from the primary reservoir when a primary power source is available, wherein the hydraulic fluid is isolated from the primary reservoir once the secondary reservoir is supplied.

6. The method of claim 5, wherein the hydraulic fluid from the primary reservoir is cleaned by a filter of the primary before being received by the secondary reservoir.

7. The method of claim 5, wherein the hydraulic device is a hydraulic parking device of a vehicle.

8. The method of claim 5, further comprising utilizing the hydraulic fluid from the secondary reservoir for a plurality of cycles of the hydraulic device.

9. The method of claim 5, further comprising preventing the hydraulic fluid from the secondary reservoir from being utilized for uses other than to cycle the hydraulic device after an initial charge.

10. A hydraulic system for a vehicle, comprising:

a primary circuit that includes:

a primary pump;

a primary reservoir; and a filter;

a secondary circuit that includes:

a secondary reservoir; and a secondary pump; and a hydraulic device operatively coupled to the primary circuit and the secondary circuit, wherein the secondary reservoir is charged with hydraulic fluid from the primary reservoir of the primary circuit, wherein the secondary circuit is utilized to operate the hydraulic device, and wherein, when the secondary reservoir is charged, the hydraulic fluid in the secondary reservoir is isolated from the primary circuit.

11. The system of claim 10, further comprising a primary power source, wherein the secondary circuit is utilized to operate the hydraulic device when the primary power source is unavailable.

12. The system of claim 10, wherein the hydraulic fluid is cleaned by the filter of the primary circuit before being received by the secondary reservoir.

* * * * *